United States Patent
Matsubayashi

(10) Patent No.: US 8,847,881 B2
(45) Date of Patent: Sep. 30, 2014

(54) GESTURE AND VOICE RECOGNITION FOR CONTROL OF A DEVICE

(75) Inventor: Koji Matsubayashi, San Diego, CA (US)

(73) Assignee: Sony Corporation, Tokyo (JP)

(*) Notice: Subject to any disclaimer, the term of this patent is extended or adjusted under 35 U.S.C. 154(b) by 162 days.

(21) Appl. No.: 13/424,642

(22) Filed: Mar. 20, 2012

(65) Prior Publication Data

US 2013/0127712 A1    May 23, 2013

Related U.S. Application Data

(60) Provisional application No. 61/561,669, filed on Nov. 18, 2011.

(51) Int. Cl.
  - G09G 5/00    (2006.01)
  - G06F 3/01    (2006.01)
  - H04N 21/485  (2011.01)
  - H04N 21/4223 (2011.01)
  - H04N 21/439  (2011.01)
  - H04N 21/44   (2011.01)
  - H04N 21/422  (2011.01)
  - G10L 15/22   (2006.01)

(52) U.S. Cl.
  CPC .......... *H04N 21/42203* (2013.01); *G06F 3/017* (2013.01); *G10L 2015/223* (2013.01); *H04N 21/485* (2013.01); *H04N 21/4223* (2013.01); *H04N 21/4394* (2013.01); *H04N 21/44008* (2013.01)
  USPC .......... 345/156; 345/173; 382/103; 715/863; 348/77; 463/36; 463/37

(58) Field of Classification Search
  USPC .......... 345/173, 156, 157, 158, 169; 715/863; 382/103; 348/77; 463/36, 37
  See application file for complete search history.

(56) References Cited

U.S. PATENT DOCUMENTS

| 7,421,390    | B2  | 9/2008  | Simpson |
| 2004/0196400 | A1  | 10/2004 | Stavely |
| 2006/0010400 | A1  | 1/2006  | Dehlin |
| 2006/0026536 | A1* | 2/2006  | Hotelling et al. ............. 715/863 |
| 2006/0182346 | A1  | 8/2006  | Yoda |
| 2009/0079813 | A1* | 3/2009  | Hildreth .................... 348/14.03 |

(Continued)

OTHER PUBLICATIONS

"PointGrab," Point Grab product page, http://www.pointgrab.com/index.php? module=PageGroups&grpID=3&articleID=22, downloaded Jul. 26, 2011, 7 pgs.

(Continued)

*Primary Examiner* — Koosha Sharifi-Tafreshi
(74) *Attorney, Agent, or Firm* — Fitch, Even, Tabin & Flannery LLP

(57) ABSTRACT

A user interface allows one or more gestures to be devised by a user and mapped or associated with one or more commands or operations of a TV or other device. The user can select the command/operation that is to be associated with each gesture that he/she devised or created. The user is not limited to the use of pre-set gestures that were previously programmed into a system and is not limited to using pre-set commands/operations that were previously associated with pre-set gestures. In alternative embodiments, voice commands or other audible signals are devised by a user and are mapped or associated with commands/operations of a device.

4 Claims, 6 Drawing Sheets

(56) References Cited

U.S. PATENT DOCUMENTS

| | | |
|---|---|---|
| 2009/0103780 A1* | 4/2009 | Nishihara et al. ............. 382/103 |
| 2009/0217210 A1 | 8/2009 | Zheng et al. |
| 2009/0315740 A1 | 12/2009 | Hildreth |
| 2010/0199231 A1* | 8/2010 | Markovic et al. ............. 715/863 |
| 2011/0026765 A1* | 2/2011 | Ivanich et al. ................ 382/103 |
| 2011/0057875 A1* | 3/2011 | Shigeta et al. ................ 345/156 |
| 2011/0058711 A1 | 3/2011 | Noda |
| 2011/0102570 A1 | 5/2011 | Wilf |
| 2011/0164143 A1 | 7/2011 | Shintani |
| 2011/0216075 A1 | 9/2011 | Shigeta |
| 2011/0221974 A1 | 9/2011 | Stern |

OTHER PUBLICATIONS

Freeman, W. T., & Weissman, C.D., "Television Control by Hand Gestures," Tech. Rep. TR94-24, Dec. 1994, 6 pgs.

Moore, Matthew, "Hand Gesture TV Could Kill Off Remote Control," http://www.telegraph.co.uk/news/2681337/Hand-gesture-TV-could-kill-off-remote-control.html, Sep. 4, 2008, 3 pgs, The Telegraph.

Albrecht, Chris, "Show of Hands: Gestures Contol Hitachi TV," http://gigaom.com/video/show-of-hands--gestures-control-hitachi-tv/, Jan. 8, 2009, 2 pgs.

\* cited by examiner

000
GESTURE AND VOICE RECOGNITION FOR CONTROL OF A DEVICE

CROSS REFERENCE TO RELATED APPLICATIONS

This application claims the benefit of priority from U.S. Provisional Application No. 61/561,669, entitled "Gesture and Voice Recognition for Control of a Device", filed on Nov. 18, 2011, which such application is incorporated herein by reference in its entirety.

FIELD OF INVENTION

This relates to an information processing apparatus and method and a program that are configured to provide a user interface for operating an electronic device on the basis of gestures or audio input.

BACKGROUND

Electronic devices, including televisions, have been controlled using buttons that are located on the devices and that are associated with pre-set functions. Also remote controllers were developed to allow users to operate the devices while the users are positioned beyond their physical reach of the buttons on the units. However the remote controllers frequently are cumbersome to use and often are not particularly intuitive. Moreover the remote controllers are easily misplaced, require battery replacement and provide a means for germs to be transmitted between users. More recently, the use of hand gestures to control virtual cursors and other objects in electronic device displays has been proposed. But these approaches suffer from a difficulty in their use.

SUMMARY OF CERTAIN EMBODIMENTS

Broadly speaking, certain embodiments of the invention relate to a user interface wherein one or more gestures are devised by a user and are mapped or associated with one or more commands or operations of a computing device, such as a TV for example. The user can select the command/operation that is to be associated with each gesture that he/she devised or created. The user is not limited to the use of pre-set gestures that were previously programmed into a system by a manufacturer or third party and is not limited to using pre-set commands/operations that were previously associated with pre-set gestures. In alternative embodiments, voice commands or other audio signals are used in lieu of gestures.

In one aspect, a first gesture of a user is received by a computing device, such as a TV, via a camera in communication with the device. A selection for an operation of the device is entered into it, wherein the operation is one of a plurality of different operations available to the user for the selection. The device associates the operation with the first gesture. A second gesture is received by the device via the camera, wherein the second gesture is substantially the same as the first gesture. The device performs the operation in response to receiving the second gesture.

In another aspect, a second selection for a second operation of the device is entered by the user into the device. The second operation is a second one of the plurality of different operations available to the user for the second selection. Next the user enters into the device a predetermined time period which is one of a plurality of time periods available for selection by the user. The associating of the first operation with the first gesture includes associating both the first operation and the second operation with the first gesture. In response to receiving the second gesture (which is substantially the same as the first gesture), the device performs the first operation, and after waiting the predetermined time period, automatically performs the second operation.

In an alternative embodiment, a first gesture of a first user is received by a first computing device via a first camera in communication with the first device. The user enters into the first device a selection for an operation of a second device, wherein the operation is one of a plurality of different operations available to the user for the selection. The first device associates the operation with the first gesture. The first device transmits to the second device data corresponding to the first gesture and corresponding to the selection of the operation of the second device. A second gesture (that is substantially the same as the first gesture) is received by the second device via a second camera in communication with it. The second device performs the operation in response to receiving the second gesture.

In an alternative embodiment, a first gesture is received by a computing device via a camera in communication with the device. An image of a face of a first person is received by the device via the camera. Also an image of a face of a second person is received by the device via the camera. A second gesture that is substantially the same as the first gesture is received by the device via the camera. The device determines whether the second gesture was made by the first person and performs an operation in response to receiving the second gesture if the second gesture was determined to have been made by the first person. On the other hand if the second gesture was determined to have been made by some one other than the first person, the device refrains from performing the operation in response to receiving the second gesture.

In another aspect, the first person enters into the device a selection for the operation of the device, wherein the operation is one of a plurality of different operations available to the first person for selection. Then the device associates the operation with the first gesture.

In an alternative embodiment a first audio signal generated by a user is received by a computing device via a microphone in communication with the device. The user enters into the device a selection for an operation of the device, wherein the operation is one of a plurality of different operations available to the user for selection. The device associates the operation with the first audio signal. The device receives via the microphone a second audio signal that is substantially the same as the first audio signal. In response to receiving the second audio signal the device performs the operation.

In another aspect, the first audio signal is a spoken word, a snapping of fingers, a clapping of hands, or a whistling.

In yet another aspect, a second selection for a second operation of the device is entered by the user into the device, wherein the second operation is a second one of the plurality of different operations available to the user for the second selection. The associating of the first operation with the first audio signal by the device further includes associating both the first operation and the second operation with the first audio signal. The performing of the first operation by the device in response to the receiving of the second audio signal further includes automatically performing the first operation and the second operation in response to the receiving of the second audio signal.

In an alternative embodiment, a first voice command generated by a first person is received by a computing device via a microphone in communication with the device. The device associates the first voice command with the first person. The first person enters into the device a selection for an operation of the device, wherein the operation is one of a plurality of different operations available to the first person for the selection. Then the device associates the operation with the first voice command. A second voice command that is substantially the same as the first voice command is received by the device via the microphone, whereupon the device determines whether the second voice command was generated by the first person. If it was determined that the second voice command was generated by the first person, the device performs an operation in response to the receiving of the second voice command. On the other hand if the second voice command was determined to have been generated by another person who is different than the first person, the device refrains from performing the operation.

In yet another embodiment, a device comprises a memory, and a processor coupled to the memory. The device further comprises a camera or a microphone (or both) coupled to the processor. The processor is operable to perform the steps of any of the above-described embodiments.

In yet another embodiment, a non-transitory, computer-readable storage medium is provided. The storage medium contains instructions that, when executed by a processor coupled to a camera or a microphone (or both), cause the processor to perform the steps of any of the above-described embodiments.

There are additional aspects to the present inventions. It should therefore be understood that the preceding is merely a brief summary of some embodiments and aspects of the present inventions. Additional embodiments and aspects are referenced below. It should further be understood that numerous changes to the disclosed embodiments can be made without departing from the spirit or scope of the inventions. The preceding summary therefore is not meant to limit the scope of the inventions. Rather, the scope of the inventions is to be determined by appended claims and their equivalents.

BRIEF DESCRIPTION OF THE DRAWINGS

These and/or other aspects and advantages of the present invention will become apparent and more readily appreciated from the following description of certain embodiments, taken in conjunction with the accompanying drawings of which.

DETAILED DESCRIPTION

Figure 1:
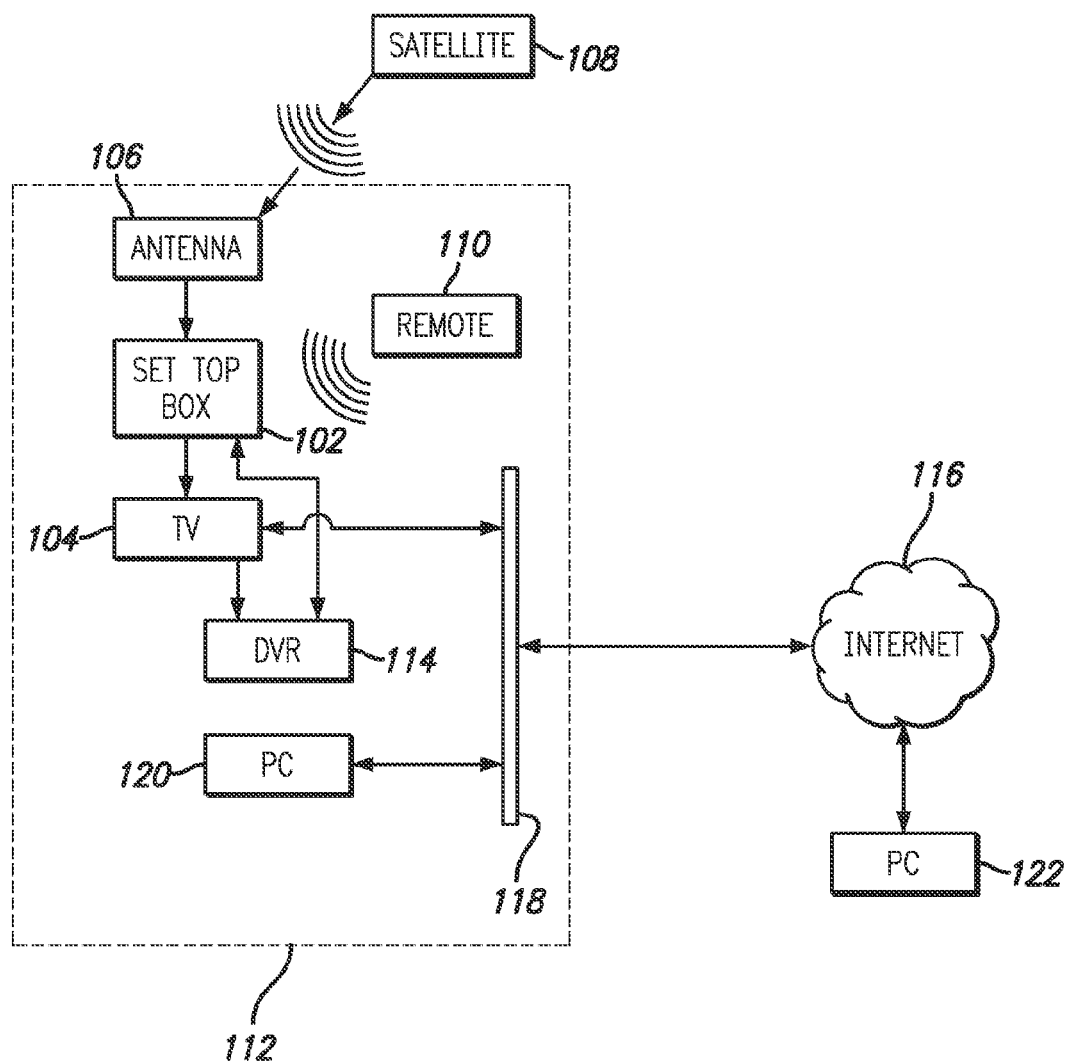
FIG. 1 is a simplified block diagram of an exemplary operating environment in which embodiments of the invention may be implemented.

The following description is of the best mode presently contemplated for carrying out the invention. Reference will be made in detail to embodiments of the present invention, examples of which are illustrated in the accompanying drawings, wherein like reference numerals refer to like elements throughout. It is understood that other embodiments may be used and structural and operational changes may be made without departing from the scope of the present invention.

Embodiments of the invention relate to a user interface wherein one or more gestures are devised by a user and are mapped or associated with one or more commands or operations of a TV or other device. The user can select the command/operation that is to be associated with each gesture that he/she devised or created. The user is not required to employ pre-set gestures that were previously programmed into a system and is not required to employ pre-set commands/operations that were previously associated with pre-set gestures. In alternative embodiments, voice commands or other audio signals are devised by a user and are mapped or associated with commands/operations of a device.

FIG. 1 is a simplified block diagram of an exemplary operating environment in which embodiments of the invention may be implemented. Content and service providers such as, for example, video, audio, data providers, and TV service providers, provide users with programming and/or data which often is provided to a receiving device such as, for example, a set top box 102, that is in communication with a television (TV) 104, or other device having a display screen and configured to receive and display the programming.

The set top box 102 in turn is in communication with a satellite antenna 106 configured to receive a signal from a communications satellite 108. In alternative embodiments the set top box 102 communicates with other data or programming sources such as, for example, an Ethernet portal, a telephone company network, a cable head-end, a terrestrial antenna, etc., that provide the programming or data. The set top box 102 processes and communicates the selected programming to the TV 104 and/or to one or more other TVs, presentation devices or storage devices.

While the illustrated embodiment shows a set top box 102, alternative embodiments include any suitable converter device or electronic equipment that is operable to receive programming. Examples of such alternative devices include a TV recording device, TV tuner, TV converter, receiver, satellite receiver, cable set-top box, cable receiver, media player, and/or TV receiving device. In some embodiments, a remote controller 110 is operable to control the TV 104 and other user devices.

While the illustrated embodiment shows the TV 104, alternative embodiments include other devices for the presentation of content or data such as, for example, a digital video recorder (DVR), a game system, a personal computer, a sound system receiver, a compact disk (CD) device, etc. Certain of these devices have one or more speakers, a display, or other output components to present video or audio content to a user.

In some embodiments, a plurality of TVs or related devices for the presentation of content/data are disposed in or near a user's premises 112 and are in direct or indirect communication with the set top box 102. Further, the set top box 102 and the TV 104 may be integrated into a single device having the above-described functionality of the set top box 102 and the TV 104, in addition to having other functionality. In addition to program content, Electronic Programming Guide ("EPG") data or similar such data is provided from a programming data source to the user's premises 112 via the Internet 116.

The receiver antenna 106 is disposed at or near the user's premises 112 which can include, for example, a residence, a business, or any other location operable to receive satellite signals. The received satellite signal is communicated to the set top box 102 which amplifies and converts the received signal into a signal suitable for communication to the TV 104 or another user device such as, for example, a DVR 114.

In alternative embodiments rather than the DVR 114 (or in addition to the DVR 114), other devices may be used that are operable to receive a signal from the set top box 102, another endpoint device, or from other devices external to the premises 112. Additional examples of such devices include a compact disk (CD) recorder, a digital video disc (DVD) recorder, other optical media recorders, a personal video recorder (PVR), game devices, magnetic tape recorders, RF transceivers, and personal computers (PCs).

The remote controller 110 serves as one type of interface between a user and the set top box 102. The remote controller 110 communicates with the set top box 102 using a wireless medium, such as infrared (IR), RF, Bluetooth, etc. (In alternative embodiments the remote controller 110 communicates directly and wirelessly with the TV 104 and the DVR 114, as well as with the set top box 102.) In addition to the DVR 114 which is in communication with the set top box 102, other devices (not shown) may also be in communication with the set top box 102 such as, for example, pointing devices, game device controllers, keyboards, etc.

In alternative embodiments, the set top box 102 may receive content, video streams and data from sources other than the antenna 106 such as, for example, from locally broadcast RF signals, from the Internet 116 (via live streaming or otherwise) by using a local network 118 or from other communication systems.

The user's premises 112 includes other devices that are in communication with the Internet 116. They include the local network 118 to which a local PC 120 and the TV 104 are communicatively coupled. In alternative embodiments other devices such as, for example, data storage devices, the set top box 102, game systems, sound system receivers, Internet connection devices, digital subscriber loop (DSL) devices, wireless LAN, WiFi, Worldwide Interoperability for Microwave Access (WiMax), etc., are communicatively coupled with the local network 118 so that all such devices may communicate with one another and with the Internet 116. Additionally a remote PC 122 that is disposed outside of the premises 112 communicates with the local PC 120 and the TV 104 via the Internet 116 and the local network 118. Thus, the local network 118 allows these interconnected devices, and the set top box 102, to communicate with each other.

The above description of the operating environment, including the user's premises 112 and the various devices disposed therein, is intended as a non-limiting overview of one of various embodiments of an operating environment in which embodiments of the invention may be implemented. The devices in the user's premises 112 and the internal and external communication systems, may contain other devices, systems and media not specifically described herein.

Figure 2:
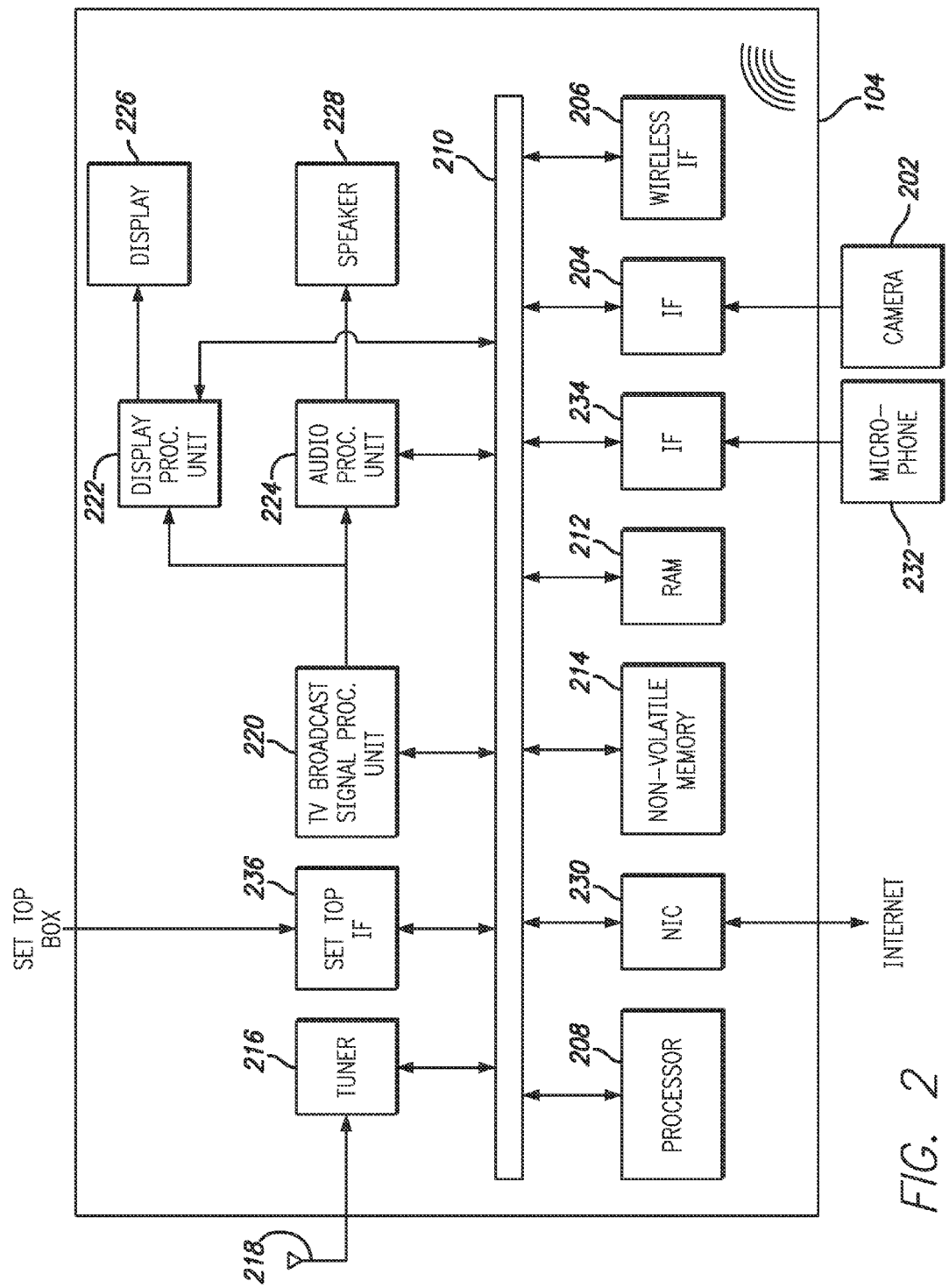
FIG. 2 is a simplified block diagram of the TV of FIG. 1 in accordance with one embodiment of the invention.

FIG. 2 is a simplified block diagram of the TV 104 of FIG. 1 in accordance with an embodiment of the invention. The TV 104 is cable connected to a camera 202 via an external interface 204. In alternative embodiments however the camera 202 is a component that is integral to or embedded in the TV 104. Moreover, the TV 104 is wirelessly connected to the remote controller 110 via a wireless interface 206.

A central processing unit (CPU) or processor 208 performs central control over various units and communicates with them via a system bus 210. The processor 208 executes one or more programs that are temporarily stored in a random access memory (RAM) 212. The programs are further stored in a nonvolatile memory 214 prior to their transfer to the RAM 212 for use. The non-volatile memory (or storage unit) includes a non-transitory, computer-readable storage medium and is for storing relatively large quantities of data, applications, etc. The non-volatile memory can be one or more hard disk drives, flash memory devices, optical drives, etc. The processor 208 reads the programs and performs various processing and controls various units in accordance with the programs.

As another type of user interface the TV 104 detects motion of a hand (or other body part) of one or more users and recognizes this motion or gesture as a command to perform an operation. Specifically, the processor 208 receives from the camera 202 data corresponding to an image of an object or person disposed in front of the camera 202 (e.g., in front of the TV 104). Motion of one or both hands of the user (or other body part) also is detected. Then, the processor 208 identifies the gestures performed by the user from the detected motion of his or her hand(s), for example, and performs processing in accordance with these operations.

As yet another user interface the processor 208 also recognizes commands initiated by the user via the remote controller 110 in accordance with the commands sent from the remote controller 110 and performs processing in accordance with this operation.

Moreover, the TV 104 has a broadcast processing function. When the TV 104 is instructed by a user command to output a broadcast signal, the TV 104 inputs, to a tuner 216, a terrestrial broadcast signal received by an external antenna 218. The processor 208 causes the tuner 216 to obtain the broadcast signal of a selected channel through the operation performed by the user, and sends this signal to a broadcast signal processing unit 220.

The processor 208 causes the broadcast signal processing unit 220 to obtain video data and audio data of a program from this broadcast signal by performing processing on it. From among this data, video data is sent from the broadcast signal processing unit 220 to a display processing unit 222, and audio data is sent from the broadcast signal processing unit 220 to an audio processing unit 224. The processor 208 further causes the display processing unit 222 to obtain a video signal by performing display processing on the video data, and sends this video signal to a display 226. As a result, video of a program is displayed for the user. The processor 208 also causes the audio processing unit 224 to obtain an audio signal by performing audio processing on the audio data, and sends this audio signal to a speaker 228. As a result, audio of the program is output from the speaker 228.

In addition to receiving the terrestrial broadcast signal via the antenna 218, the TV 104 further receives signals from the satellite antenna 106 via the set top box 102. (FIG. 1) These signals are transmitted to a set top box interface 236 which in turn processes and transmits them to the bus 210 for further processing in a manner that is generally similar to that described above.

A network interface card (NIC) 230 is connected to the bus 210 and serves as an interface with the Internet 116 via the local network 118 so that the processor 208 may send and receive data to and from the Internet as well as other components in communication with the local network 118. Moreover a microphone 232 is connected to the bus 210 via a microphone interface 234 thus permitting the processor 208 to receive and process audio data.

The camera 202 is connected to the TV 104 via the external interface 204 of the TV 104 so that the image data generated by the camera 202 can be sent to the processor 208. According to one embodiment the TV 104 recognizes one or more users who are in front of the TV 104 in accordance with the image data sent from the camera 202. Specifically, the processor 208 of the TV 104 performs facial detection and recognition processing as well as gesture recognition of dynamic gesture movement of a user on the image data generated by the camera 202. The processor 208 detects the hand movement and the face of one or more users by performing this detection processing.

There are various known algorithms for facial detection and facial recognition. For example according to one algorithm, an area of skin color and feature values (portions assumed to be the eye and mouth) within this area of skin color are extracted from a camera image, and it is determined whether the area of skin color is the face in accordance with a position relationship between these feature values. The processor 208 detects areas, each of which is determined to be the face, from a camera image by using such an algorithm, and obtains the coordinates of each of the detected face areas.

Additionally, human gestures are detected, processed and associated with a command or function. According to one embodiment an indication is received by the TV 104 from a user that he/she desires to create a gesture and assign it to one or more commands or functions. The indication for initiating the process of creating the assignment is received by using one or more different types of inputs (e.g., remote control keys, motions, other gestures, touch screens, etc). The user moves one or both hands (or other body parts) according to a specific user-created gesture such that the camera 202 captures the image motion and generates raw motion data for the gesture which in turn is received by the TV 104. The recorded raw motion data is processed to determine one or more motions or gestures to be associated with the raw motion data.

In some embodiments, the motion is stored as a gesture in a database. The indication for gesture creation and assignment may be received after the user moves his/her hand(s) according to a user-created gesture. For example, the user may move his/her hand(s) according to a user-created gesture that is currently unrecognizable by the TV 104. The TV 104 queries the user to determine if the user desires to store the unrecognized gesture and associate it for a particular command or function. If there is an affirmative response, the gesture may be used as motion input or command for future use.

Function mapping information for the gesture is received from the user and may include, for example, functions, operations, commands, input instructions, and/or tasks which the user desires to be mapped to or associated with the user-created gesture. In some embodiments, such function mapping information may comprise a series of functions (e.g., a macro or batch command) that may be associated with a particular gesture. The function mapping information is stored in another database.

The local PC 120 and remote PC 122 of FIG. 1 are also each comprised of generally similar components that are arranged in a generally similar configuration as that of the TV 104 of FIG. 2. In some embodiments the connections between the local PC 120, the remote PC 122 and the TV 104 can be wireless or via one or more cables or via any combination thereof. In the illustrated example, only two PC's and one TV are shown, but those skilled in the art will appreciate that any number of devices and TVs may be connected to the local network 118, the Internet 116 or another type of network. The PCs 120, 122 provide functions for transferring electronic messages and other data from one device to another or to the TV 104, sometimes via other message servers or electronic devices.

In a manner similar to the TV 104, the remote PC 122 includes a processor, a read-only memory (ROM), a RAM and a storage unit, all of which are coupled or interconnected via a bus. The processor is configured to execute a variety of processing operations as directed by programs and applications stored in the ROM or loaded from a storage unit into the RAM. The storage unit or non-volatile memory includes a non-transitory, computer-readable storage medium and is for storing relatively large quantities of data, applications, etc. The storage unit can be one or more hard disk drives, flash memory devices, optical drives, etc. The RAM also stores data and so on necessary for the processor to execute a variety of applications and processing operations as required. The ROM, the RAM and/or the storage unit stores operating software and applications that are used along with the processor to enable the operation of the remote PC 122.

The remote PC 122 further includes at least one input device, such as for example, a keyboard and a mouse, a microphone for receiving voice or other sound input, a camera for receiving images, a pointing device, a touch screen display, or a remote-controlled wireless input unit, such as for example a television remote control-type unit. Alternative embodiments can include any combination of the foregoing types of input devices, as well as other input devices. Thus the remote PC 122 permits user input via a user action that includes clicking a mouse button when a cursor is positioned over a pre-defined area of an output device, such as for example a display unit based upon a LCD. (The output device can further include a speaker for providing voice prompts and spoken words, music and system tones.) Other user actions for input can include a generation by the user of a sound or a gesture, a selection using the television-type remote control unit, a depressing of a key on the keyboard, a movement of the pointing device or a touching on the touch screen display with the pointing device or with the user's finger, or a selection of a displayed indication.

The bus of the remote PC 122 further couples or connects the input device, the output device, the storage unit, and a communication device. The communication device can be a modem, a network interface card (NIC), a wireless access card or adapter, or other terminal adapter, for example. The communication device executes communication processing via the network, sends data supplied from the processor, and outputs data received from the network to the processor, the RAM, and the storage unit. The communication device also communicates analog signals or digital signals with other electronic devices.

The bus of the remote PC 122 is also connected or coupled to a drive as required on which a non-transitory, computer-readable storage medium, such as a magnetic disk, an optical disk, a magneto-optical disk, or a semiconductor memory for example, is loaded with computer applications containing instructions or with other data read from any of these storage media. These instructions and data, when executed by the processor, cause it to perform a plurality of methods or functions. The local PC 120 is comprised of generally similar components that operate in a generally similar manner as that of the remote PC 122. Moreover the set top box 102 and the DVR 114 of FIG. 1 are each comprised of some of the components as described above for the remote PC 122 and the TV 104, which such components operate in a generally similar manner.

While FIGS. 1 and 2 show one configuration of the TV 104, the remote PC 122, the local PC 120 and other devices, alternative embodiments include a cellular phone, a so-called "smart" hone, a portable digital assistant, a tablet computer and any other type of a computer or processor-driven device. Moreover, alternative embodiments need not incorporate a TV, but rather may include a communication among the PCs directly with each other.

Figure 3:
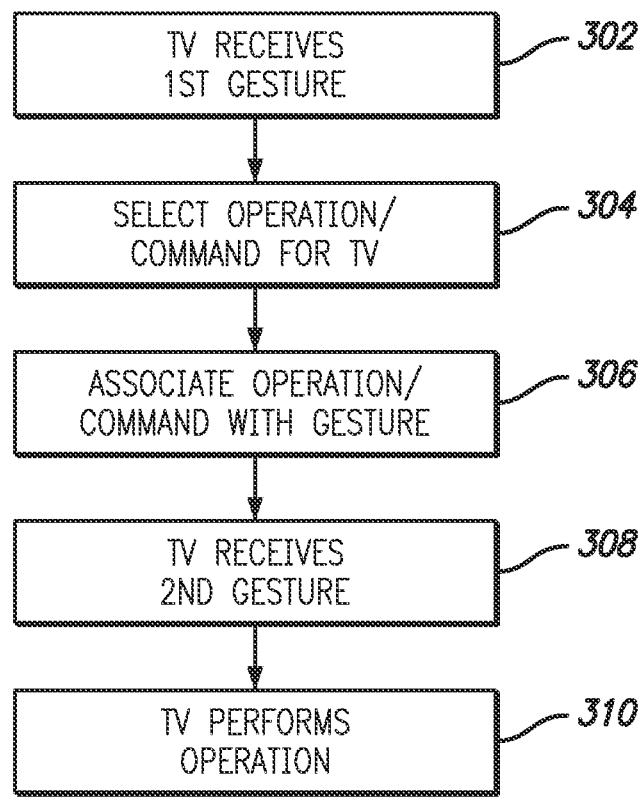
FIG. 3 is a simplified process flow of a method of providing a user interface that incorporates the use of gestures according to an embodiment of the invention.

As previously mentioned, embodiments of the invention provide for a user interface wherein one or more gestures are devised by a user and are mapped or associated with one or more commands or operations of a TV or other device. The user can select the command/operation that is to be associated with each gesture that he/she devised or created. The user is not required to employ pre-set gestures that were previously programmed into a system and is not required to employ pre-set commands/operations that were previously associated with pre-set gestures. FIG. 3 illustrates a simplified process flow of one such embodiment. The process starts with the receipt of a first gesture of a user by a TV (or other computing device) via a camera in communication with the TV. (Step 302) The user enters into the TV a selection for an operation which is one of a plurality of different operations available for selection. (Step 304) The TV associates the operation with the first gesture in response to the entering of the selection. (Step 306) The TV receives a second gesture via the camera, the second gesture being substantially the same as the first gesture. (Step 308) The second gesture can be performed by either the user who created the gesture or by another user. In response to receiving the second gesture the TV performs the operation. (Step 310) The performing of the operation by the TV can include, for example, the starting of an application, such as for example a video game, or an Internet browser directed to a preselected web site, such as Facebook™, YouTube™, or Skype™, for example. Other operations can include the displaying of a preselected channel of content that is available to the user. Yet other operations can include pausing the rendering of content, fast-forwarding the rendering of the content, recording the content and modifying a volume level of audio of the content.

While FIG. 3 illustrates an embodiment involving one gesture and associated operation, it should be understood that alternative embodiments involve a plurality of gestures and operations. For example according to one embodiment a computing device receives a first plurality of gestures of a user. The user enters into the computing device a plurality of selections for a plurality of operations or commands of the computing device. The computing device associates the plurality of operations with the first plurality of gestures, so that each one of the plurality of operations is associated with a different one of the plurality of selections. The computing device then receives a second plurality of gestures, wherein each one of the second plurality of gestures is substantially the same as a corresponding one of the first plurality of gestures. The computing device performs each one of the plurality of operations, one at a time, in response to the receiving of each corresponding one of the second plurality of gestures.

Figure 4:
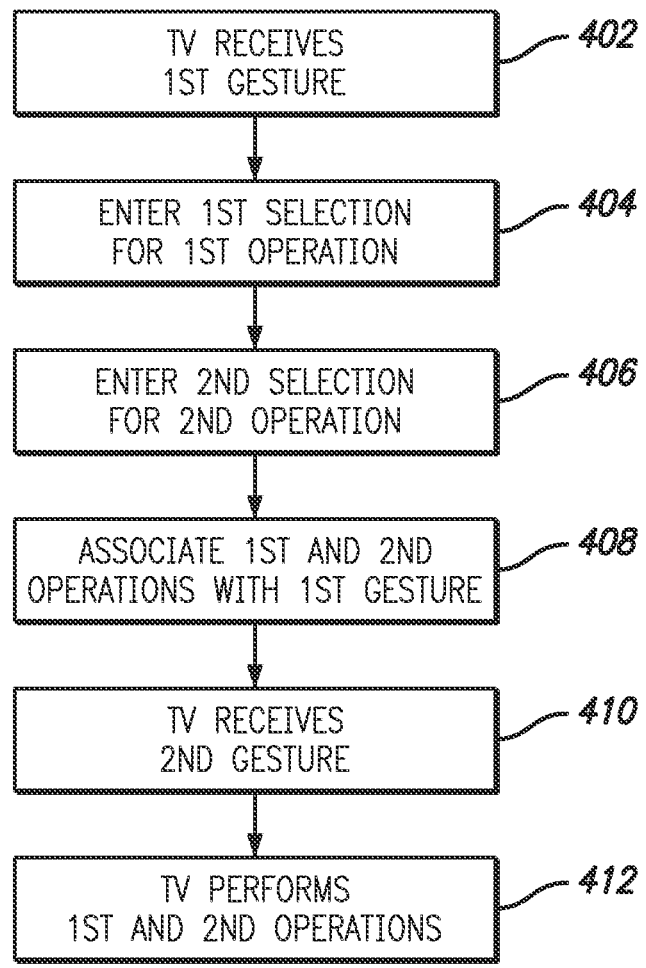
FIG. 4 is a simplified process flow of another method of providing a user interface that incorporates the use of gestures according to an alternative embodiment of the invention.

The above-described embodiments generally relate to the creating of user-defined gestures and assigning them to operations or commands of a TV or other computing device. FIG. 4 illustrates a simplified process flow of an alternative embodiment in which a single gesture is defined for performing a series of operations, e.g., a sort of macro or batch command operation. Thus a type of gesture-based shortcut is created. The process starts with the receipt of a first gesture of a user by a TV (or other computing device) via a camera in communication with the TV. (Step 402) The user enters into the TV a first selection for a first operation which is one of a plurality of different operations available for selection. (Step 404) The user then enters a second selection for a second operation of the TV, (Step 406) The TV associates both the first and second operations with the first gesture. (Step 408) The TV receives a second gesture via the camera, the second gesture being substantially the same as the first gesture. (Step 410) In response to receiving the second gesture the TV automatically performs both the first operation followed by the second operation without any further user input or command. (Step 412)

The multiple operations can include, for example, a first operation being the display on a TV of a preselected first channel of programming, and a second operation being the display of a preselected second channel of programming after the first channel has been displayed for a predetermined time period. Thus for example a user may want to create a special gesture that is recognized by the TV to be a command for automatically tuning into and displaying a first channel which is a channel that is dedicated to news content, for example. After displaying the news content channel for a predetermined amount of time, such as five minutes for example, the TV (without receiving any further user input or command) automatically changes channels and displays a second channel which is another one of the user's favorite channels. Also according to an alternative embodiment, the user can select and enter into the TV any predetermined time period of the user's choice (and thus not be restricted to any fixed, system-imposed time period) for an amount of time that would elapse prior to the initiation of the second TV operation.

Another example of the use of multiple operations includes the first operation being the displaying of an item of content, and the second operation being the recording of the item of content while it is being displayed. Thus for example upon receiving a special gesture that was created and defined by a user, a TV would automatically tune into and display a first channel of the user's choice and (without receiving any further user input or command) commence the recording of the content of that channel while it is being displayed.

Figure 5:
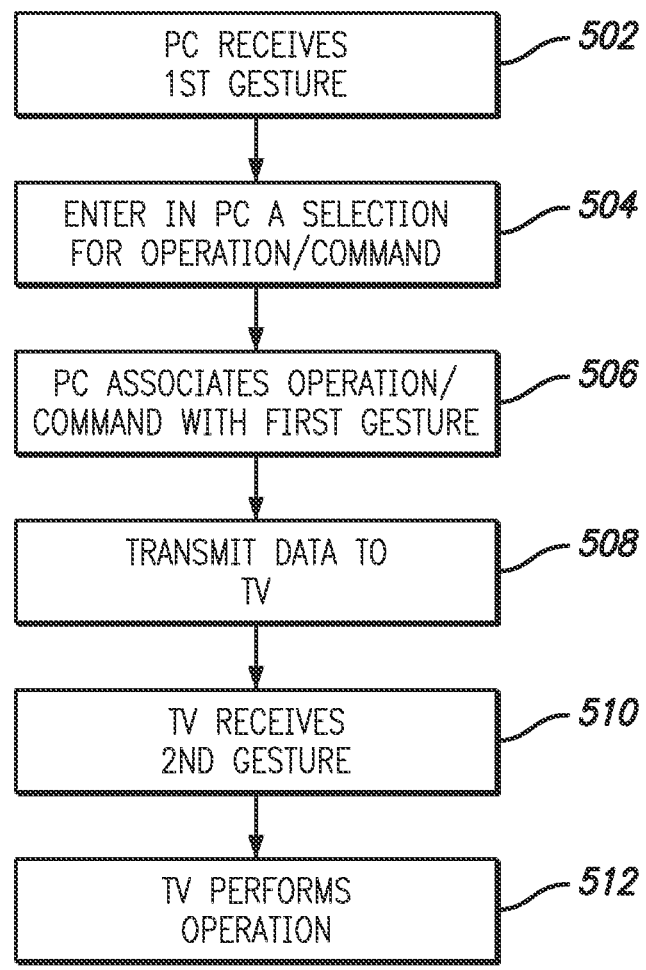
FIG. 5 is a simplified process flow of another method of providing a user interface that incorporates the use of gestures according to another alternative embodiment of the invention.

FIG. 5 illustrates a simplified process flow of an alternative embodiment in which a gesture is defined at a computer or other device for performing an operation action by a separate device, such as a TV. Such an embodiment is useful, for example, in those situations where a local user lacks the skill or desire to create and define gestures for controlling his/her local device, but another person can use a remote device and remotely assist the local user by creating and defining gestures at the remote device. This gesture-related information is transmitted to the local device for use by the local user.

The process starts with the receipt of a first gesture of a user by a first computing device (such as a PC, for example) via a first camera in communication with the first device. (Step 502) Next the user enters into the first device a selection for an operation or command to be performed by a second computing device (such as a TV, for example), wherein the operation is one of a plurality of different operations available to the user for the selection. (Step 504) Then the first device associates the operation with the first gesture in response to the entering of the selection, (Step 506) Next, data corresponding to the first gesture and corresponding to the selection of the assigned operation to be performed by the second computing device is transmitted from the first device to the second device, (Step 508) According to some embodiments this data is transmitted via a local network or via the Internet or both. The second device receives via a second camera a second gesture that is substantially the same as the first gesture. (Step 510) The second gesture can be performed at the second device by either the user who created the first gesture and assignment at the first device or by another user. In response to receiving the second gesture, the second device automatically performs the assigned operation. (Step 512) According to various embodiments, the first device can be a laptop computer, a desktop computer, a tablet computer, a handheld device, or a TV, and the second device can be another laptop computer, desktop computer, tablet computer, handheld device, or TV.

Figure 6:
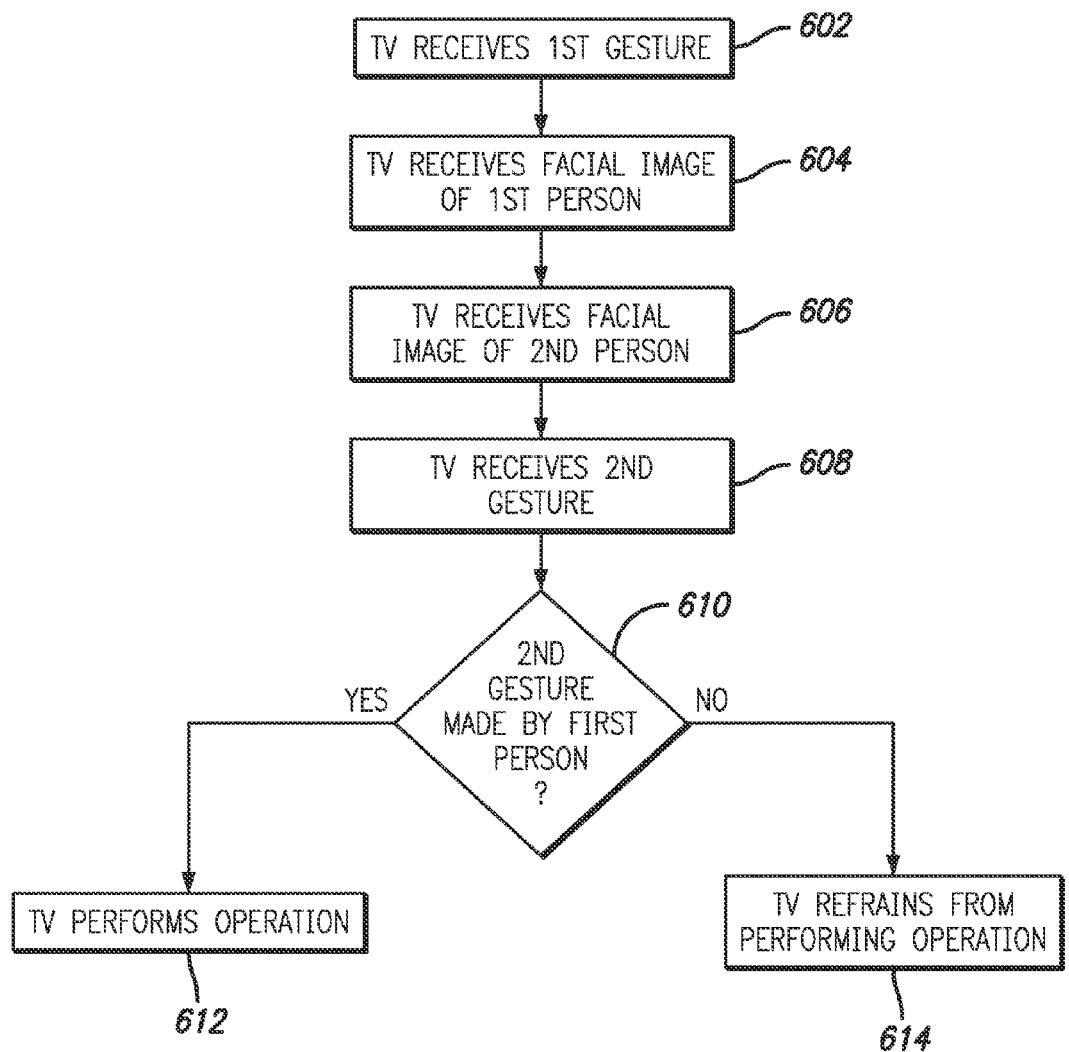
FIG. 6 is a simplified process flow of another method of providing a user interface that incorporates the use of gestures according to yet another alternative embodiment of the invention.

FIG. 6 illustrates a simplified process flow of an embodiment in which facial recognition is used so that only gestures of one or more specified users are accepted by a computing device which ignores the gestures of other persons who may be present. The process starts with the receipt of a first gesture by a TV (or other computing device) via a camera in communication with the TV. (Step 602) An image of a face of a first person also is received by the TV via the camera. (Step 604) Also an image of a face of a second person is received by the TV via the camera. (Step 606) A second gesture that is substantially the same as the first gesture is then received by the TV via the camera, (Step 608) Using facial recognition a determination is made whether the second gesture was made by the first person. (Step 610) In response to receiving the second gesture the TV performs an operation if it was determined that the second gesture was made by the first person, (Step 612) On the other hand if the second gesture was determined to have been made by the second person (or by any person other than the first person), then the TV refrains from performing the operation. (Step 614)

All of the above-described embodiments involve gestures that are received and recognized by a computing device as commands to perform various operations or functions. In alternative embodiments, however, voice commands or other audio signals generated by a user are used in a similar manner as described above for gestures. For example in one embodiment, a first audio signal generated by a user is received by a computing device via a microphone in communication with the computing device. The user enters into the device a selection for an operation of the device. In response to the entering of the selection the device associates the operation with the first audio signal. Upon receiving a second audio signal generated by the user that is substantially the same as the first audio signal the device performs the operation. The audio signals can be any one or combination of various audible signals or noises including, but not limited to, one or more spoken words, a snapping of fingers, a clapping of hands or a whistling.

In yet another embodiment, voice recognition is used to respond to only the audio commands of one or more specific users and to ignore audio commands of other persons. For example in one embodiment a first voice command generated by a first person is received by a computing device via a microphone in communication with the device. The device associates the first voice command with the first person. A second voice command that is substantially the same as the first voice command is received by the device via the microphone. A determination is made whether the second voice command was generated by the first person. If it was determined that the second voice command was generated by the first person the device performs an operation. On the other hand if the second voice command was determined to have been generated by another person, the device refrains from performing the operation.

Alternative embodiments are not restricted to the receipt of only gestures or only audio signals. Rather certain embodiments include the receipt of a combination of gestures and audio signals which are recognized by a computing device as commands to perform the various operations or functions as previously described herein.

In view of the above, it will be appreciated that embodiments of the invention overcome many of the long-standing problems in the art by providing a user interface wherein one or more gestures can be devised by a user and mapped or associated with one or more commands or operations of a TV or other electronic device. The user can select the command/operation that is to be associated with each gesture that he/she devised or created. The user is not required to employ pre-set gestures that were previously programmed into a system and is not required to employ pre-set commands/operations that were previously associated with pre-set gestures. In alternative embodiments, voice commands or other audible signals are devised by a user and are mapped or associated with commands/operations of an electronic device.

While the description above refers to particular embodiments of the present invention, it will be understood that many modifications may be made without departing from the spirit thereof. The claims are intended to cover such modifications as would fall within the true scope and spirit of the present invention. The presently disclosed embodiments are therefore to be considered in all respects as illustrative and not restrictive, the scope of the invention being indicated by the claims rather than the foregoing description, and all changes which come within the meaning and range of equivalency of the claims are therefore intended to be embraced therein.

What is claimed is:

1. A method for providing an interface, comprising:
receiving, by a computing device via a camera in communication with the computing device, the computing device having a display, a first gesture of a user;
entering, by the user into the computing device, a predetermined time period which is one of a plurality of time periods available for selection by the user;
entering into the computing device a first selection for a first operation of the computing device, wherein the first operation is displaying a preselected first channel on the display;
associating, by the computing device, the first operation with the first gesture;
receiving, by the computing device via the camera, a second gesture, wherein the second gesture is substantially the same as the first gesture;
performing the first operation by the computing device in response to the receiving of the second gesture;
entering, by the user into the computing device, a second selection for a second operation of the computing device, wherein the second operation is displaying a preselected second channel on the display after the preselected first channel has been displayed for the predetermined time period, and
wherein each of the first channel and the second channel are of a plurality of channels of content available to the user
wherein the associating of the first operation with the first gesture includes associating both the first operation and the second operation with the first gesture,
wherein the performing of the first operation includes automatically performing the first operation and the second operation the receiving of the second gesture.

2. A method for providing an interface, comprising:
receiving, by a first computing device via a first camera in communication with the first computing device, a first gesture of a user;
entering, by the user into the first computing device, a selection for an operation of a second computing device, wherein the operation is one of a plurality of different operations available to the user for the selection;
associating, by the first computing device, the operation with the first gesture;

transmitting, from the first computing device to the second computing device, data corresponding to the first gesture and corresponding to the selection of the operation of the second computing device;

receiving, by the second computing device via a second camera in communication with the second computing device, a second gesture, wherein the second gesture is substantially the same as the first gesture; and performing the operation by the second computing device in response to the receiving of the second gesture.

3. The method of claim 2 wherein the first computing device is one of a laptop computer, a desktop computer, a tablet computer, and a handheld device, and wherein the second computing device is a television.

4. A device for use by a user, comprising:

a memory;

a camera;

a display; and a processor coupled to the memory, the camera and the display and operable to perform steps comprising:

receiving via the camera a first gesture of the user;

receiving from the user a predetermined time period which is one of a plurality of time periods available for selection by the user;

receiving a first selection by the user for a first operation to be performed by the processor, wherein the first operation is the displaying of a preselected first channel on the display;

associating the first operation with the first gesture;

receiving via the camera a second gesture, wherein the second gesture is substantially the same as the first gesture;

performing the first operation in response to the receiving of the second gesture;

receiving a second selection from the user for a second operation to be performed by the processor, wherein the second operation is the displaying of a preselected second channel on the display after the preselected first channel has been displayed for the predetermined time period, and wherein each of the first channel and the second channel are of a plurality of channels of content available to the user, wherein the associating of the first operation with the first gesture includes associating both the first operation and the second operation with the first gesture, and wherein the performing of the first operation includes automatically performing the first operation and the second operation in response to the receiving of the second gesture.

* * * * *

UNITED STATES PATENT AND TRADEMARK OFFICE
CERTIFICATE OF CORRECTION

PATENT NO. : 8,847,881 B2
APPLICATION NO. : 13/424642
DATED : September 30, 2014
INVENTOR(S) : Matsubayashi Page 1 of 1

It is certified that error appears in the above-identified patent and that said Letters Patent is hereby corrected as shown below:

On the TITLE PAGE:
Page 2, Item (56), column 2, OTHER PUBLICATIONS, line 7, delete "Contol" and insert --Control--.
In the CLAIMS:
Claim 1, column 12, line 57, delete "operation the receiving" and insert --operation by the computing device in response to the receiving--.

Signed and Sealed this
Seventeenth Day of March, 2015

Michelle K. Lee
*Director of the United States Patent and Trademark Office*